(12) United States Patent
Albritton (10) Patent No.: US 6,793,204 B2
(45) Date of Patent: Sep. 21, 2004

(54) BREAKAWAY SUPPORT POST FOR HIGHWAY GUARDRAIL END TREATMENTS

(75) Inventor: James R. Albritton, Fort Worth, TX (US)

(73) Assignee: TRN Business Trust, Dallas, TX (US)

( * ) Notice: Subject to any disclaimer, the term of this patent is extended or adjusted under 35 U.S.C. 154(b) by 0 days.

(21) Appl. No.: 10/210,444

(22) Filed: Aug. 1, 2002

(65) Prior Publication Data

US 2002/0179894 A1 Dec. 5, 2002

Related U.S. Application Data

(62) Division of application No. 09/074,496, filed on May 7, 1998.
(60) Provisional application No. 60/046,015, filed on May 9, 1997.

(51) Int. Cl.⁷ .............................................. E01F 15/00
(52) U.S. Cl. ..................................................... 256/13.1
(58) Field of Search .................................... 256/13.1, 1

(56) References Cited

U.S. PATENT DOCUMENTS

| | | |
|---|---|---|
| 79,141 A | 6/1868 | McFarlin |
| 398,078 A | 2/1889 | Peterson |
| 446,852 A | 2/1891 | Davis |
| 629,185 A | 7/1899 | Arnold |
| 1,335,302 A | 3/1920 | Stout |
| 1,473,118 A | 11/1923 | Miller-Masury |
| 1,677,796 A | 7/1928 | Parks |
| 2,089,929 A | 8/1937 | Brickman et al. |
| 2,091,195 A | 8/1937 | Dennebaum |
| 2,123,167 A | 7/1938 | Cain |
| 2,135,705 A | 11/1938 | Florance |
| 2,146,445 A | 2/1939 | Russert et al. |
| 2,309,238 A | 1/1943 | Corey |
| 2,735,251 A | 2/1956 | Dlugosch |
| 2,776,116 A | 1/1957 | Brickman |
| 3,308,584 A | 3/1967 | Graham ..................... 52/98 X |
| 3,332,666 A | 7/1967 | Gray ......................... 256/13.1 |
| 3,349,531 A | 10/1967 | Watson ..................... 52/296 X |
| 3,385,564 A | 5/1968 | Persicke .................... 256/13.1 |
| 3,417,965 A | 12/1968 | Gray ......................... 256/13.1 |
| 3,450,233 A | 6/1969 | Massa .......................... 188/1 |
| 3,499,630 A | 3/1970 | Dashio ...................... 256/13.1 |
| 3,519,301 A | 7/1970 | Somnitz ........................ 293/1 |
| 3,521,917 A | 7/1970 | King ......................... 287/111 X |
| 3,567,184 A | 3/1971 | Yancey ...................... 256/13.1 |
| 3,606,222 A | 9/1971 | Howard ...................... 52/98 X |
| 3,617,076 A * | 11/1971 | Attwood et al. ......... 256/13.1 X |
| 3,637,244 A | 1/1972 | Strizki ........................ 287/129 |
| 3,643,924 A | 2/1972 | Fitch ......................... 256/13.1 |
| 3,680,448 A | 8/1972 | Ballingall et al. |
| 3,693,940 A | 9/1972 | Kendall et al. |
| 3,711,881 A | 1/1973 | Chapman et al. |

(List continued on next page.)

FOREIGN PATENT DOCUMENTS

| | | |
|---|---|---|
| AT | 278890 | 2/1976 |
| AU | A-21844/88 | 11/1996 |
| CA | 2167548 | 7/1996 |

(List continued on next page.)

OTHER PUBLICATIONS

International Search Report for PCT/US98/09029, Sep. 1, 1998.

(List continued on next page.)

Primary Examiner—John Cottingham
(74) Attorney, Agent, or Firm—Baker Botts L.L.P.

(57) ABSTRACT

A support post for a guardrail which resists impact by a motor vehicle from one direction (strong direction) and yields to impact by a motor vehicle from another direction (weak direction). The support post is adapted to receive the guardrail such that the rail face of the guardrail runs generally perpendicular to the strong direction such that the support post resists an impact on the rail face of the guardrail and yields to an impact force on the end of the guardrail.

18 Claims, 5 Drawing Sheets

U.S. PATENT DOCUMENTS

| | | |
|---|---|---|
| 3,768,781 A | 10/1973 | Walker et al. |
| 3,776,520 A | 12/1973 | Charles et al. |
| 3,820,906 A | 6/1974 | Katt |
| 3,846,030 A | 11/1974 | Katt |
| 3,912,404 A | 10/1975 | Katt |
| 3,925,929 A | 12/1975 | Montgomery |
| 3,951,556 A | 4/1976 | Strizki |
| 3,967,906 A | 7/1976 | Strizki |
| 3,981,486 A | 9/1976 | Baumann |
| 4,063,713 A | 12/1977 | Anolick et al. |
| 4,071,970 A | 2/1978 | Strizki |
| 4,126,403 A | 11/1978 | Sweeney et al. |
| 4,183,695 A | 1/1980 | Wilcox |
| 4,236,843 A | 12/1980 | Chisholm |
| 4,269,384 A | 5/1981 | Saeed et al. |
| 4,278,228 A | 7/1981 | Rebentisch et al. |
| 4,295,637 A | 10/1981 | Hulek |
| 4,330,106 A | 5/1982 | Chisholm |
| 4,389,134 A | 6/1983 | Colas |
| 4,399,980 A | 8/1983 | van Schie |
| 4,490,062 A | 12/1984 | Chisholm |
| 4,583,716 A | 4/1986 | Stephens et al. |
| 4,607,824 A | 8/1986 | Krage et al. |
| 4,646,489 A | 3/1987 | Feller et al. |
| 4,655,434 A | 4/1987 | Bronstad |
| 4,678,166 A | 7/1987 | Bronstad et al. |
| 4,729,690 A | 3/1988 | Lavender et al. |
| 4,784,515 A | 11/1988 | Krage et al. |
| 4,815,565 A | 3/1989 | Sicking et al. |
| 4,838,523 A | 6/1989 | Humble et al. |
| 4,852,847 A | 8/1989 | Pagel |
| 4,923,319 A | 5/1990 | Dent |
| 4,926,592 A | 5/1990 | Nehls |
| 4,928,446 A | 5/1990 | Alexander, Sr. |
| 4,928,928 A | 5/1990 | Buth et al. |
| 4,986,687 A | 1/1991 | Ivey |
| 5,022,782 A | 6/1991 | Gertz et al. |
| 5,078,366 A | 1/1992 | Sicking et al. |
| 5,203,543 A | 4/1993 | Fleury |
| 5,214,886 A | 6/1993 | Hugron |
| 5,286,137 A | 2/1994 | Cicinnati et al. |
| 5,391,016 A | 2/1995 | Ivey et al. |
| 5,407,298 A | 4/1995 | Sicking et al. |
| 5,484,217 A | 1/1996 | Carroll et al. |
| 5,503,495 A | 4/1996 | Mak et al. |
| 5,547,309 A | 8/1996 | Mak et al. |
| 5,595,470 A | 1/1997 | Berkey et al. |
| 5,657,966 A | 8/1997 | Cicinnati |
| 5,664,905 A | 9/1997 | Thompson et al. |
| 5,775,675 A | 7/1998 | Sicking et al. |
| 5,797,591 A | 8/1998 | Krage |
| 5,924,680 A | 7/1999 | Sicking et al. |
| 5,931,448 A | 8/1999 | Sicking et al. |
| 5,957,435 A | 9/1999 | Bronstad |
| 5,988,598 A | 11/1999 | Sicking et al. |
| 6,022,003 A | 2/2000 | Sicking et al. |
| 6,065,894 A | 5/2000 | Wasson et al. |
| 6,109,597 A | 8/2000 | Sicking et al. |
| 6,129,342 A | 10/2000 | Bronstad |
| 6,210,066 B1 | 4/2001 | Dent |
| 6,220,575 B1 | 4/2001 | Lindsay et al. |
| 6,244,571 B1 | 6/2001 | Reid et al. |
| 6,254,063 B1 | 7/2001 | Rohde et al. |
| 6,260,827 B1 | 7/2001 | Sicking et al. |
| 6,308,809 B1 | 10/2001 | Reid et al. |
| 6,398,192 B1 | 6/2002 | Albritton |
| 6,409,156 B2 | 6/2002 | Dent |
| 6,416,041 B1 | 7/2002 | Sicking et al. |
| 6,488,268 B1 | 12/2002 | Albritton |
| 6,583,363 B1 | 6/2003 | Wilson, Jr. |
| 6,644,888 B2 | 11/2003 | Ochoa |

FOREIGN PATENT DOCUMENTS

| | | |
|---|---|---|
| DE | 916 361 | 5/1965 |
| DE | 278890 | 4/1969 |
| DE | 1534526 | 11/1969 |
| DE | 3708861 | 10/1988 |
| EP | 0245042 | 4/1987 |
| FR | 2 386 667 | 4/1977 |
| FR | 2546932 | 6/1983 |
| GB | 2023695 A | 1/1986 |
| JP | 10-18255 | 1/1989 |
| LU | 40465 | 5/1962 |
| LU | 41444 | 5/1962 |
| WO | 98/50637 | 12/1998 |
| WO | 00/40805 | 7/2000 |

OTHER PUBLICATIONS

Written Opinion for PCT/US99/30463, Nov. 22, 2000.
Written Opinion for PCT/US98/09029, Mar. 29, 2000.
ET–2000 The Future of Highway Safety—SYRO (Printed in Dec. 1990; revised Oct. 1992), Oct. 1992.
International Preliminary Examination Report for PCT/US99/30463. Mar. 21, 2001.
International Preliminary ExaminationReport for PCT/US98/09029, Jul. 12, 2000.
International Search Report for PCT/US99/30463, Apr. 28, 2000.
U.S. patent application Publication No. US 2001/0013596 dated Aug. 16, 2001 for U.S. patent application Ser. No. 09/410,635 filed Oct. 1, 1999 by Dean L. Sicking et al., Aug. 16, 2001.
U.S. patent application Publication No. US 2002/0007994 dated Jan. 24, 2002 for U.S. patent application Ser. No. 09/935,949 filed Aug. 23, 2001 by John D. Reid et al. Assigned to Safety By Design Company, Jan. 24, 2002.
*Bronstad, et al., Modified Breakaway Cable Terminals for Guardrails and Median Barriers*, Research Results Digest, NCHRP, Transportation Research Board, Digest 12, May 1978.
*Breakaway Support Post for Highway Guardrail End Treatments* patent application USSN 09/358,017 filed Jul. 19, 1999 James R. Albritton (091078.0774), Jul. 19, 1999.
Webster's II New College Dictionary, p. 444, 1995.

* cited by examiner

BREAKAWAY SUPPORT POST FOR HIGHWAY GUARDRAIL END TREATMENTS

CROSS REFERENCE TO RELATED APPLICATIONS

This application is a divisional from U.S. patent application Ser. No. 09/074,496, filed on May 7, 1998 by James R. Albritton and entitled "Breakaway Support Post for Highway Guardrail End Treatments" that claims benefit of U.S. Provisional Application Serial No. 60/046,015 filed May 9, 1997.

The application is also related to U.S. Divisional patent application Ser. No. 09/835,282 filed Apr. 12, 2001 and entitled "Breakaway Support Post for Highway Guardrail End Treatments", now U.S. Pat. No. 6/488,268.

TECHNICAL FIELD OF THE INVENTION

The present invention relates to highway guardrail systems having a guardrail mounted on posts, and more particularly, to guardrail end treatments designed to meet applicable federal and state safety standards including but not limited to crash worthiness requirements.

BACKGROUND OF THE INVENTION

Along most highways there are hazards which present substantial danger to drivers and passengers of vehicles if the vehicles leave the highway. To prevent accidents from a vehicle leaving a highway, guardrail systems are often provided along the side of the highway. Experience has shown that guardrails should be installed such that the end of a guardrail facing oncoming traffic does not present another hazard more dangerous than the original hazard requiring installation of the associated guardrail systems. Early guardrail systems often had no protection at the end facing oncoming traffic. Sometimes impacting vehicles became impaled on the end of the guardrail causing extensive damage to the vehicle and severe injury to the driver and/or passengers. In some reported cases, the guardrail penetrated directly into the passenger's compartment of the vehicle fatally injuring the driver and passengers.

Various highway guardrail systems and guardrail end treatments have been developed to minimize the consequences resulting from a head-on impact between a vehicle and the extreme end of the associated guardrail. One example of such end treatments includes tapering the ends of the associated guardrail into the ground to eliminate potential impact with the extreme end of the guardrail. Other types of end treatments include breakaway cable terminals (BCT), vehicle attenuating terminals (VAT), the SENTRE end treatment, and breakaway end terminals (BET).

It is desirable for an end terminal assembly installed at one end of a guardrail facing oncoming traffic to attenuate any head-on impact with the end of the guardrail and to provide an effective anchor to redirect a vehicle back onto the associated roadway after a rail face impact with the guardrail downstream from the end terminal assembly. Examples of such end treatments are shown in U.S. Pat. No. 4,928,928 entitled Guardrail Extruder Terminal, and U.S. Pat. No. 5,078,366 entitled Guardrail Extruder Terminal.

A SENTRE end treatment often includes a series of breakaway steel guardrail support posts and frangible plastic containers filled with sandbags. An impacting vehicle is decelerated as the guardrail support posts release or shear and the plastic containers and sandbags are compacted. A cable is often included to guide an impacting vehicle away from the associated guardrail.

A head-on collision with a guardrail support post located at the end of a guardrail system may result in vaulting the impacting vehicle. Therefore, guardrail end treatments often include one or more breakaway support posts which will yield or shear upon impact by a vehicle. Examples of previously available breakaway posts are shown in U.S. Pat. No. 4,784,515 entitled Collapsible Highway Barrier and U.S. Pat. No. 4,607,824 entitled Guardrail End Terminal. Posts such as shown in the '515 and the '824 patents include a slip base with a top plate and a bottom plate which are designed to not yield upon lateral impact. When sufficient axial impact force is applied to the upper portion of the associated post, the top plate and the bottom plate will slide relative to each other. If a vehicle contacts the upper part of the post, the associated impact forces tend to produce a bending moment which may reduce or eliminate any slipping of the top plate relative to the bottom plate. Also, improper installation of the top plate relative to the bottom plate, such as over tightening of the associated mechanical fasteners, may prevent proper functioning of the slip base. A breakaway support post is also shown in U.S. Pat. No. 5,503,495 entitled Thrie-Beam Terminal with Breakaway Post Cable Release.

Wooden breakaway support posts are frequently used to releasably anchor guardrail end treatments and portions of the associated guardrail. Such wooden breakaway support posts, when properly installed, generally perform satisfactorily to minimize damage to an impacting vehicle during either a rail face impact or a head-on impact. However, impact of a vehicle with a wooden breakaway support post may often result in substantial damage to the adjacent soil. Removing portions of a broken wooden post from the soil is often both time consuming and further damages the soil. Therefore, wooden breakaway support posts are often installed in hollow metal tubes, sometimes referred to as foundation sleeves, and/or concrete foundations. For some applications, one or more soil plates may be attached to each metal sleeve to further improve the breakaway characteristics of the associated wooden post. Such metal sleeves and/or concrete foundations are relatively expensive and time consuming to install.

Light poles, sign posts or similar items are often installed next to a roadway with a breakable or releasable connection. For some applications, a cement foundation may be provided adjacent to the roadway with three or more bolts projecting from the foundation around the circumference of the pole. Various types of frangible or breakable connections may be formed between the bolts and portions of the light pole or sign post.

SUMMARY OF THE INVENTION

In accordance with teachings of the present invention, various shortcomings of previous guardrail support posts associated with highway guardrail end treatments have been addressed. The present invention provides a breakaway support post which will buckle or yield during head-on impact by a vehicle at or near the extreme end of an associated guardrail to minimize damage to the vehicle and provide sufficient strength to direct a vehicle back onto an associated roadway during a rail face impact with the guardrail downstream from the guardrail end treatment. The use of breakaway support posts incorporating teachings of the present invention substantially reduces the time and cost associated with initial installation of a guardrail end treatment and repair of the guardrail end treatment following impact by a motor vehicle.

One aspect of the present invention includes providing a breakaway support post having one or more slots formed in the support post to allow the support post to buckle or yield in response to forces applied to the support post in a first direction by an impacting vehicle without causing excessive damage to the vehicle. The orientation and location of the slots are selected to allow the support post to effectively anchor the guardrail to direct an impacting vehicle back onto an adjacent roadway in response to forces applied to the support post in a second direction during a downstream rail face impact. For some applications, one or more plates may be attached to the breakaway support post and inserted into the soil to provide additional support during a rail face impact with the associated guardrail and to provide more reliable buckling or yielding of the breakaway support post during a head-on impact with one end of the associated guardrail. Alternatively, the length of the portion of the breakaway support post inserted into the soil may be increased to enhance these same characteristics. For some applications, the breakaway support post may have a typical I-beam cross section with slots formed in one or more flange portions of the I-beam. Alternatively, the breakaway support post may have a hollow, rectangular or square cross section with slots formed in one or more sides of the post in accordance with teachings of the present invention.

Another aspect of the present invention includes providing a breakaway support post having a first portion or an upper section and a second portion or a lower section with the first portion rotatably coupled with the second portion. A pivot pin or other suitable type of rotatable coupling preferably connects adjacent ends of the first portion and the second portion to allow rotation of the first portion relative to the second portion. The pivot pin is preferably oriented during installation of the associate breakaway support post to allow rotation of the first portion when force is applied thereto in one direction and to block rotation of the first portion when force is applied thereto in a second direction. A shear pin or other suitable releasing mechanism may be provided to releasably couple the first portion and the second portion aligned longitudinally with each other. The shear pin and pivot pin are preferably oriented such that during a head-on impact with the end of the associated guardrail facing oncoming traffic, the shear pin will fail and allow the upper section to rotate relative to the lower section and thus minimize damage to the impacting vehicle. For some applications, a release bar or push bar may be attached to the lower section to assist with disengagement of the upper section from the lower section during such rotation of the upper section. During a rail face impact with the associated guardrail, the same orientation of the shear pin and the pivot pin prevents the upper section from rotating relative to the lower section. Thus, the breakaway support post will buckle or yield during a head-on impact to minimize damage to an impacting vehicle and will remain intact to redirect an impacting vehicle back onto the associated roadway after a rail face impact.

Technical advantages of the present invention include providing breakaway support posts which are easier to initially install and to repair as compared to wooden breakaway support posts. Major portions of each breakaway support post may be fabricated from standard, commercially available steel I-beams using conventional metal bending and stamping techniques in accordance with teachings of the present invention. One or more metal soil plates may be attached to each breakaway support post to further enhance desired characteristics of yielding or buckling during head-on impact with one end of an associated guardrail to minimize damage to an impacting vehicle and to securely anchor the associated guardrail to redirect an impacting vehicle back onto the adjacent roadway after a rail face impact. Breakaway support posts incorporating teachings of the present invention may be used with a wide variety of guardrail end treatments having various types of energy absorbing assemblies located at or near the end of the associated guardrail facing oncoming traffic. For many applications, breakaway support posts may be satisfactorily installed adjacent to the edge of a roadway without the use of steel foundation tubes and/or concrete foundations typically associated with installing wooden breakaway support posts and other types of breakaway support posts.

A further aspect of the present invention includes providing guardrail support posts having a first portion or upper section attached or coupled, at least in part, by a frangible connection, to a second portion or lower section. The support post and frangible connection may be oriented in accordance with teachings of the present invention to resist impact by a motor vehicle from one direction (strong direction), and to yield to impact by a motor vehicle from another direction (weak direction). Preferably, the fragile connection allows the upper portion of the post to deflect slightly and then break off of the lower portion, thus minimizing lifting of the impacting vehicle into the air.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE INVENTION

The preferred embodiments of the present invention and its advantages are best understood by referring to the FIGS. 1 through 16 of the drawings, like numerals being used for like and corresponding parts of the various drawings.

Figure 1:
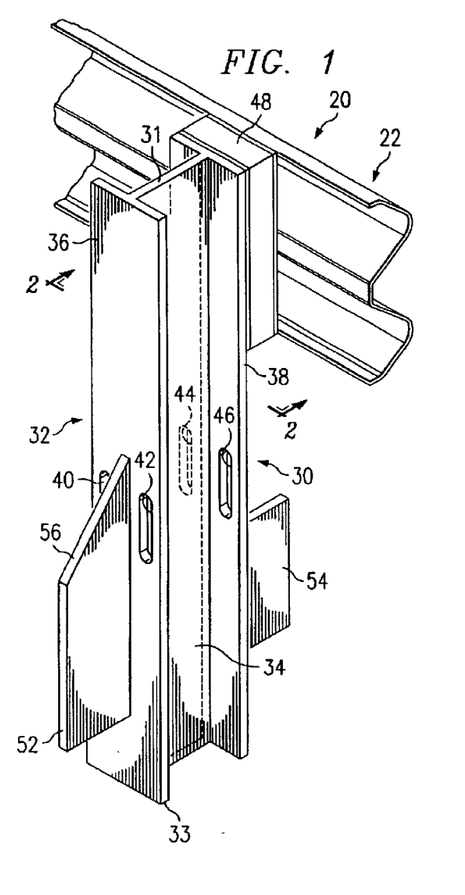
FIG. 1 is a schematic drawing showing an isometric view with portions broken away of a highway guardrail system having a breakaway support post with a guardrail mounted thereon in accordance with one embodiment of the present invention.
Figure 2:
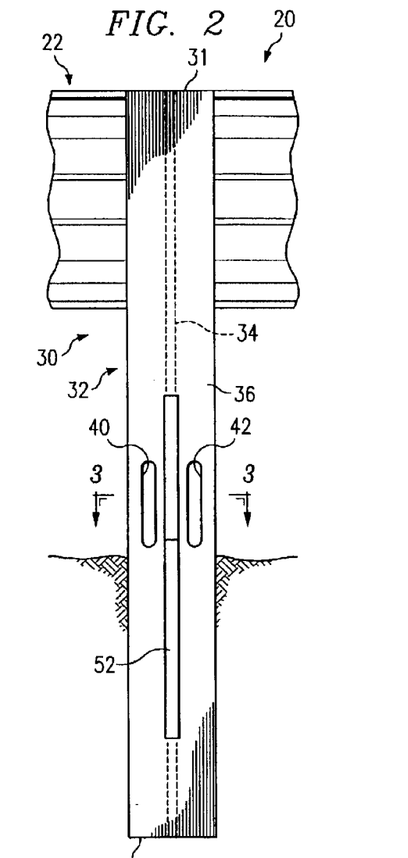
FIG. 2 is a schematic drawing in elevation with portions broken away showing a side view of the highway guardrail system of FIG. 1.
Figure 3:
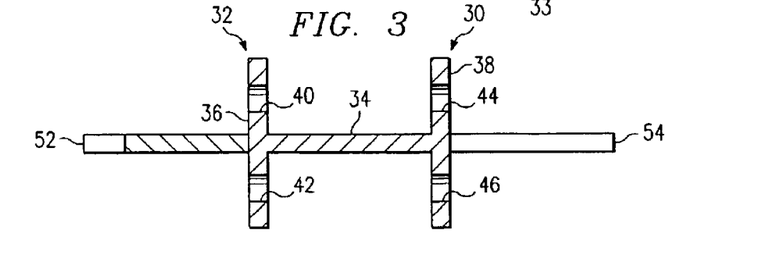
FIG. 3 is a schematic drawing in section of the breakaway support post taken along lines 3—3 of FIG. 2.

Portions of highway guardrail system 20 incorporating one embodiment of the present invention are shown in FIGS. 1, 2 and 3. Portions of highway guardrail systems 120, 220, and 320 incorporating alternative embodiments of the present invention are shown in FIGS. 4 through 13. Breakaway support posts incorporating further embodiments of the present invention are shown in FIGS. 14A through 16. Highway guardrail systems 20, 120, 220, and 320 are typically installed along the edge of a highway or roadway (not expressly shown) adjacent to a hazard (not expressly shown) to prevent a vehicle (not shown) from leaving the associated highway or roadway.

Guardrail systems 20, 120, 220, and 320 are primarily designed and installed along a highway to withstand a rail face impact from a vehicle downstream from an associated end treatment. Various types of guardrail end treatments (not expressly shown) are preferably provided at the end of guardrail 22 facing oncoming traffic. Examples of guardrail end treatments satisfactory for use with the present invention are shown in U.S. Pat. No. 4,655,434 entitled Energy Absorbing Guardrail Terminal; U.S. Pat. No. 4,928,928 entitled Guardrail Extruder Terminal; and U.S. Pat. No. 5,078,366 entitled Guardrail Extruder Terminal. Such guardrail end treatments extend substantially parallel with the associated roadway. U.S. Pat. No. 4,678,166 entitled Eccentric Loader Guardrail Terminal shows a guardrail end treatment which flares away from the associated roadway. U.S. Pat. Nos. 4,655,434; 4,928,928; 5,078,366; and 4,678,166 are incorporated herein by reference. When this type of guardrail end treatment is hit by a vehicle, the guardrail will normally release from the associated support post and allow the impacting vehicle to pass behind downstream portions of the associated guardrail. However, breakaway support posts incorporating teachings of the present invention may be used with any guardrail end treatment or guardrail system having satisfactory energy-absorbing characteristics for the associated roadway and anticipated vehicle traffic.

Support posts 30, 130, 230, 330 and 530 have a strong direction and a weak direction. When a post is subjected to an impact from the strong direction, the post exhibits high mechanical strength. The strong direction is typically oriented perpendicular to the guardrail. Thus, when the post is impacted by a vehicle in the strong direction (such as when the vehicle impacts the face of the guardrail), the post will remain intact and standing, and the vehicle will be redirected back onto the road. When the post is subjected to an impact from the weak direction, the post exhibits low mechanical strength. The weak direction is typically oriented parallel to the guardrail. Thus, when the post is impacted by a vehicle in the weak direction (such as when the vehicle impacts the end of the guardrail), the portion of the post that is substantially above the ground will either break off or bend over, so as to avoid presenting a substantial barrier to the vehicle. Preferably, the upper portion of the post will deflect slightly and then break off, in order to minimize lifting of the impacting vehicle into the air.

One or more support posts 30, 130, 230, 330, and 530 are preferably incorporated into the respective guardrail end treatment to substantially minimize damage to a vehicle during a head-on impact with the end of guardrail 22 facing oncoming traffic. The number of support posts 30, 130, 230, 330 and 530 and the length of guardrail 22 may be varied depending upon the associated roadway, the hazard adjacent to the roadway requiring installation of highway guardrail system 20, 120, 220 or 320, anticipated vehicle traffic on the associated roadway, and the selected guardrail end treatment. As discussed later in more detail, breakaway support posts 30, 130, 230, 330 and 530 will securely anchor guardrail 22 during a rail face impact or side impact with guardrail 22 to redirect an impacting vehicle back onto the associated roadway. Support posts 30, 130, 230, 330 and 530 will yield or buckle during a head-on impact with the end of guardrail 22 without causing excessive damage to an impacting vehicle.

Support posts 30, 130, 230, 330 and 530 may be fabricated from various types of steel alloys or other materials with the desired strength and/or breakaway characteristics appropriate for the respective highway guardrail system 20, 120, 220, and 320. For some applications, a breakaway support post incorporating teachings of the present invention may be fabricated from ceramic materials or a mixture of ceramic and metal alloys which are sometimes referred to as cermets.

Portions of breakaway support posts 30, 130, 230, 330 and 530, as shown in FIGS. 1–16, have the general configuration associated with a steel I-beam. Alternatively, the teachings of the present invention may be incorporated into a breakaway support post having a generally hollow or solid, rectangular, square or circular cross section.

Breakaway support posts 30, 130, 230, 330 and 530 as shown in FIGS. 1–16, have respective upper portions and lower portions with approximately the same general cross-section. However, for some applications, the upper portion of a breakaway support post incorporating teachings of the present invention may have a cross-section which is substantially different from the cross-section of the associated lower portion. For example, the upper portion may have the general configuration associated with an I-beam, while the associated lower portion may have a general configuration associated with either a hollow or solid cylindrical post or a hollow or solid square post.

In FIGS. 1, 2, 4, 7 and 10, highway guardrail systems 20, 120, 220 and 320 are shown having a typical deep W-beam twelve (12) gauge type guardrail 22. For some applications, a thrie beam guardrail may be satisfactorily used. Other types of guardrails, both folded and non-folded, may be satisfactorily used with breakaway support posts 30, 130, 230, 330 and 530 incorporating the teachings of the present invention. Breakaway support posts 30, 130, 230, 330 and 530 may sometimes be described as direct drive support posts.

Various techniques which are well known in the art may be satisfactorily used to install breakaway support posts 30, 130, 230, 330 and 530 depending upon the type of soil conditions and other factors associated with the roadway and the hazard requiring installation of respective highway guardrail systems 20, 120, 220, and 320. For many applications, breakaway support posts 30, 130, 230, 330 and 530 may be simply driven into the soil using an appropriately sized hydraulic and/or pneumatic driver. As a result, breakaway support posts 30, 130, 230, 330 and 530 may be easily removed from the soil using an appropriately sized crane or other type of pulling tool. For many applications, breakaway posts 30, 130, 230, 330 and 530 may be satisfactorily used to install guardrail 22 adjacent to an associated roadway without the use of metal foundation tubes or other types of post-to-ground installation systems such as concrete with a steel slip base support. U.S. Pat. No. 5,503,495, entitled Thrie-Beam Terminal With Breakaway Post Cable Release, shows one example of a breakaway support post with this type of foundation.

As shown in FIGS. 1, 2 and 3, breakaway support post 30 includes elongated body 32 defined in part by web 34 with flanges 36 and 38 attached thereto. Elongated body 32 may be formed by cutting a steel I-beam (not expressly shown) into sections having the desired length for elongated body 32. A pair of elongated slots 40 and 42 are preferably formed in flange 36 on opposite sides of web 34. Similarly, a pair of slots 44 and 46 are preferably formed in flange 38 on opposite sides of web 34. Slots 40, 42, 44 and 46 are formed intermediate first end 31 and second end 33 of breakaway support post 30. Slots 40, 42, 44 and 46 define in part a frangible or yieldable connection between an upper portion and a lower portion of support post 30.

The length of breakaway support post 30 and the location of slots 40, 42, 44 and 46 will depend upon various factors including soil conditions and the anticipated amount of force that will be applied to breakaway support post 30 during a rail face impact with guardrail 22 and during a head-on impact with one end of guardrail 22. For the embodiment shown in FIGS. 1, 2 and 3, slots 40, 42, 44 and 46 are formed in breakaway post 30 at a location corresponding approximately with the anticipated ground line when breakaway support post 30 is properly installed adjacent to the associated roadway.

For one application, elongated body 32 may be formed from a standard steel I-beam with flanges 36 and 38 having a nominal width of four (4") inches and web 34 having a nominal width of six (6") inches. Slots 40, 42, 44 and 46 have a generally elongated oval configuration approximately six (6") inches in length and one fourth (¼") inch in width. Slots 40, 42, 44, and 46 are positioned intermediate ends 31 and 33 to cause local buckling of the associated breakaway post 30 when properly installed.

For the embodiments shown in FIGS. 1 and 2, block 48 is disposed between breakaway support post 30 and guardrail 22. Block 48 may sometimes be referred to as a "blockout." For other applications, guardrail 22 may be directly mounted adjacent to end 31 of breakaway support post 30. During a rail face impact between a vehicle and guardrail 22 downstream from the associated end treatment, block 48 provides a lateral offset between breakaway support post 30 and guardrail 22. The distance and direction of the lateral offset is selected to prevent the wheels (not shown) of an impacting vehicle from striking breakaway support post 30 during the rail face impact.

For the embodiment shown in FIGS. 1, 2 and 3, breakaway support post 30 includes soil plates 52 and 54 which are attached to the exterior of respective flanges 36 and 38 adjacent to the portion of breakaway support post 30 which will be inserted into the soil adjacent to the associated roadway. For this embodiment, soil plates 52 and 54 have approximately the same thickness as web 34 and are generally aligned with web 34 on opposite sides of respective flanges 36 and 38.

Breakaway support post 30 is preferably installed with web 34 extended approximately perpendicular from guardrail 22 and flanges 36 and 38 extending generally parallel with guardrail 22. By aligning web 34 approximately perpendicular to guardrail 22, breakaway support post 30 will provide sufficient support to resist large forces associated with a rail face impact or rail face impact between a vehicle and guardrail 22. As a result of forming slots 40, 42, 44 and 46 in respective flanges 36 and 38 and orienting flanges 36 and 38 generally parallel with guardrail 22, a head-on impact from a vehicle with one end of guardrail 22 will result in buckling or yielding of breakaway support post 30.

The amount of force required to buckle and/or fracture breakaway support post 30 may be decreased by increasing the size and/or the number of slots 40, 42, 44 and 46 formed in respective flanges 36 and 38. Alternatively, reducing the number and/or size of slots 40, 42, 44 and 46 will result in a larger amount of force required to buckle or yield breakaway support post 30.

The orientation of soil plates 52 and 54, relative to a head-on impact with one end of guardrail 22 will prevent twisting or tilting of breakaway support post 30 during the head-on impact. The additional support provided by soil plates 52 and 54 will increase the reliability of breakaway support post 30 yielding or buckling at the general location of slots 40, 42, 44 and 46 in response to a selected amount of force applied adjacent to end 31 of post 30 in a first direction corresponding to the direction of a head-on impact with one end of guardrail 22. Soil plate 52 includes a generally triangular portion 56 which extends above elongated slots 40, 42, 44 and 46 to provide additional support for breakaway support post 30 and guardrail 22 during a rail face impact.

For some applications, the length of elongated body 32 may be increased such that soil plates 52 and 54 are no longer required to provide additional support for the resulting breakaway support post 30. Eliminating soil plates 52 and 54 will allow a hydraulic or pneumatic hammer to more quickly install the associated breakaway support post 30 and a crane or hydraulic/pneumatic pulling tool to more easily remove a damaged breakaway support post 30. Alternatively, breakaway support post 30 could be inserted into an appropriately sized concrete foundation and/or metal sleeve. Soil plates, concrete foundation, sleeves and other anchoring devices can be used in any of the posts of the present invention.

For some applications, it may be preferable to form a breakaway support post in accordance with teachings of the present invention from an elongated body having a generally hollow, rectangular or square configuration (not shown). Slots 40, 42, 44 and 46 may then be formed in opposite sides of the resulting breakaway support post which are aligned generally parallel with the associated guardrail similar to flanges 36 and 38. The other pair of opposite sides preferably extend approximately normal from the associated guardrail similar to web 34.

When force is applied adjacent to end 31 of breakaway support post 30 in a second direction corresponding with a rail face impact between a vehicle and guardrail 22, web 34 will resist buckling of breakaway support post 30 and provide sufficient support to redirect the impacting vehicle back onto the roadway.

Figures 4, 5, 6:
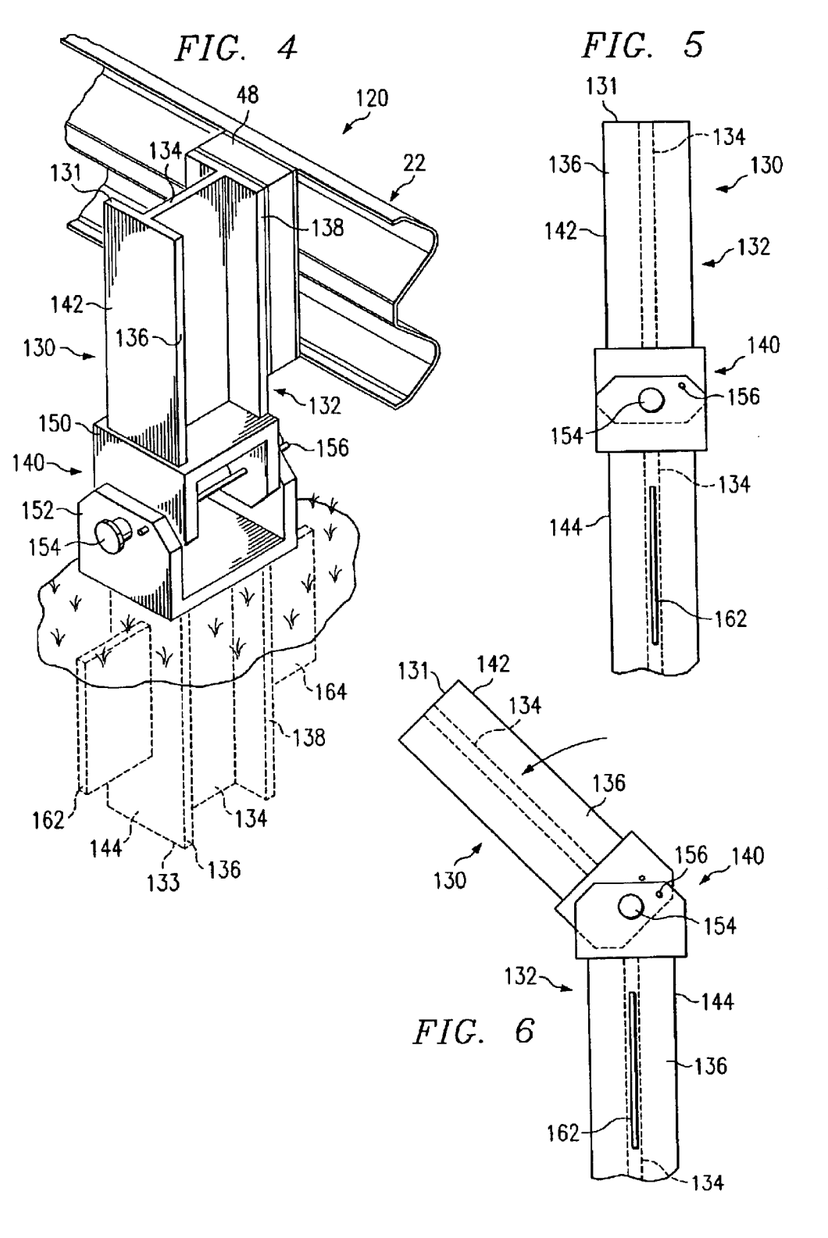
FIG. 4 is a schematic drawing showing an isometric view with portions broken away of a highway guardrail system having a breakaway support post with a guardrail mounted thereon in accordance with another embodiment of the present invention.
FIG. 5 is a schematic drawing in elevation with portions broken away showing a side view of the breakaway support post of FIG. 4 in its first position.
FIG. 6 is a schematic drawing in elevation with portions broken away showing a side view of the breakaway support post of FIG. 5 rotating from its first position to a second position in response to a force applied to the breakaway support post in one direction corresponding with an impact by a vehicle with one end of the associated guardrail.

Breakaway support post 130, as shown in FIGS. 4, 5 and 6, includes elongated body 132 having an upper portion 142 and a lower portion 144 which are rotatably coupled with each other. For the embodiment of the present invention shown in FIGS. 4, 5 and 6, rotatable coupling assembly 140 is preferably installed intermediate ends 131 and 133 of elongated body 132. Upper portion 142 and lower portion 144 each have a general configuration of an I-beam defined in part by respective webs 134 and flanges 136 and 138. Upper portion 142 and lower portion 144 may be formed from a conventional steel I-beam in the same manner as previously described.

For the embodiment of the present invention as shown in FIGS. 4, 5 and 6, rotatable coupling assembly 140 includes a first generally U-shaped bracket 150 attached to one end of upper portion 142, opposite end 131 and a second U-shaped bracket 152 attached to the end of lower portion 144 opposite from end 133. Brackets 150 and 152 each have a generally open, U-shaped configuration with extensions substantially parallel to the flanges and protruding beyond the respective webs. A portion of bracket 150 is preferably sized to fit within a corresponding portion of bracket 152. Pivot pin 154 extends laterally through adjacent portions of bracket 150 and 152 in a direction which is generally parallel with webs 134. The resulting breakaway support post 130 is preferably installed with webs 134 and pivot pin 154 extending generally normal from the associated guardrail 22. As a result of this orientation, webs 134 and rotatable coupling assembly 140 including pivot pin 154 allow breakaway support post 130 to sufficiently support guardrail 22 during a rail face impact to redirect an impacting vehicle back onto the associated roadway.

In FIGS. 4, 5 and 6, respective webs 134 of upper portion 142 and lower portion 144 are shown generally aligned parallel with each other. For some applications, the orientation of lower portion 144 may be varied with respect to upper portion 142 such that web 134 of lower portion 144 extends approximately parallel with guardrail 22. The attachment of brackets 150 and 152 with their respective upper portion 142 and lower portion 144 may be modified to accommodate various orientations of lower portion 144 relative to upper portion 142.

Depending upon the length of lower portion 144 and the type of soil conditions, soil plates 162 and 164 may be attached to lower portion 144 extending from respective flanges 136 and 138. For some applications, lower portion 144 may be substantially longer than upper portion 142. As a result of increasing the length of lower portion 144, the use of soil plates 162 and 164 may not be required.

Shear pin 156 is laterally inserted through adjacent portions of brackets 150 and 152 offset from pivot pin 154. Shear pin 156 preferably has a relatively small cross-section as compared to pivot pin 154. As a result, when a vehicle impacts with one end of guardrail 22, shear pin 156 will break and allow upper portion 142 to rotate relative to lower portion 144 as shown in FIG. 6. Shear pin 156 maintains upper portion 142 and lower portion 144 generally aligned with each other during installation of the associated breakaway support post 30.

Figure 15A:
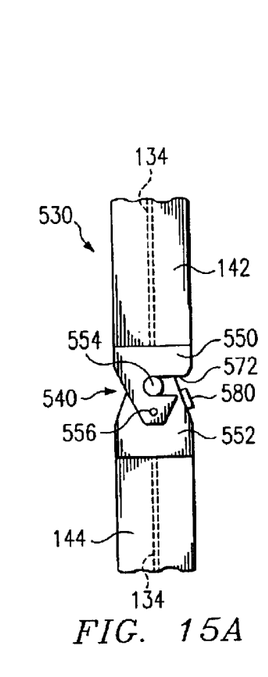
FIG. 15A is a schematic drawing in elevation with portions broken away showing a detail side view of a breakaway post in accordance with still another embodiment of the present invention.
Figure 15B:
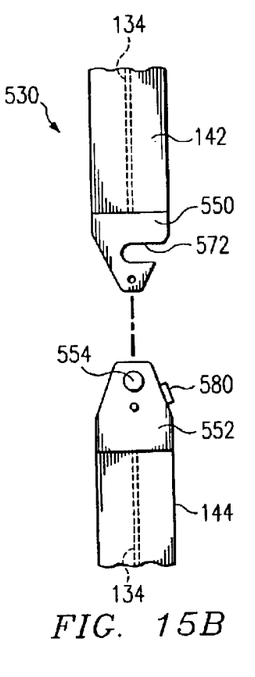
FIG. 15B is a schematic drawing in elevation with portions broken away showing the upper portion and the lower portion of the breakaway support post of FIG. 15A disconnected from each other.
Figure 15C:
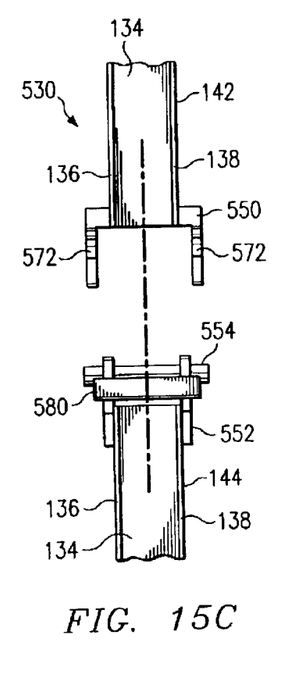
FIG. 15C is a schematic drawing in elevation with portions broken away showing another side view of the breakaway support post of FIG. 15B.
Figure 16:
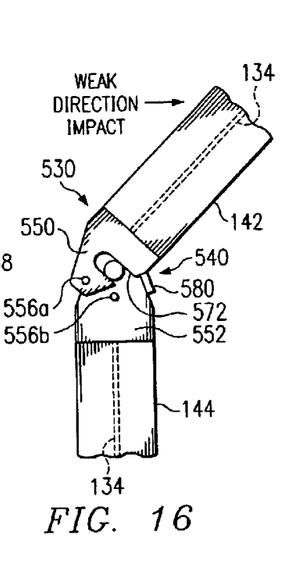
FIG. 16 is a schematic drawing in elevation with portions broken away showing a side view of the breakaway support post of FIG. 15A rotating from its first position to a second position in response to a force supplied to the breakaway support post in one direction corresponding with an impact by a vehicle with one end of an associated guardrail.

The amount of force required to fracture or break shear pin 156 may be determined by a variety of parameters such as the diameter of shear pin 156, the type of material used to fabricate shear pin 156, the number of locations (either along a single pin or with plural pins) that must be sheared, and the distance between shear pin 156 and pivot pin 154. As discussed later in more detail with respect to breakaway support post 530, as shown in FIGS. 15A through 16, rotatable coupling 540 may be modified to allow upper portion 542 to disconnect and separate from lower portion 544.

Various types of releasing mechanisms other than shear pin 156 may be satisfactorily used to maintain upper portion 142 and lower portion 144 generally aligned with each other during normal installation and use of the associated breakaway support post 130. A wide variety of shear bolts, shear screws and/or breakaway clamps may be used to releasably attach first bracket 150 with second bracket 152.

When a vehicle impacts with one end of guardrail 22, force is applied in a first direction to upper portion 142 and will break shear pin 156. As a result, upper portion 142 will then rotate relative to lower portion 144 as shown in FIG. 6.

Figure 7:
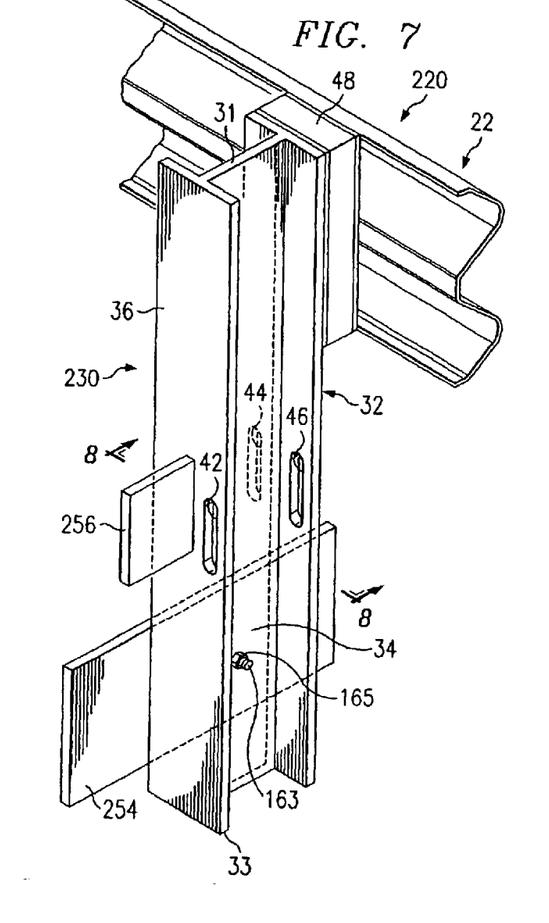
FIG. 7 is a schematic drawing showing an isometric view with portions broken away of a highway guardrail system having a breakaway support post with a guardrail mounted thereon in accordance with a further embodiment of the present invention.
Figure 8:
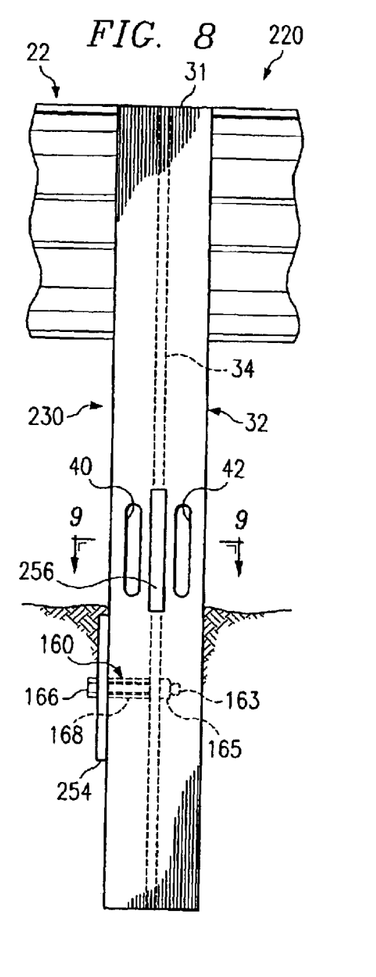
FIG. 8 is a schematic drawing in elevation with portions broken away showing a side view of the highway guardrail system of FIG. 7.
Figure 9:
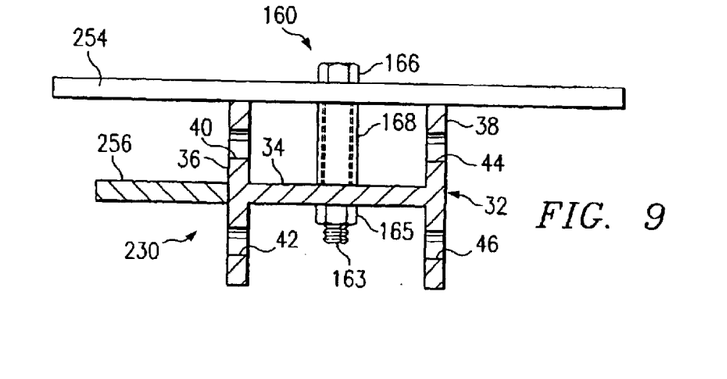
FIG. 9 is a schematic drawing in section of the breakaway support post taken along lines 9—9 of FIG. 8.

FIGS. 7, 8 and 9 show portions of highway guardrail system 220 which includes breakaway support post 230 and guardrail 22. Breakaway support post 230 includes elongated body 32 and is similar in both design and function with breakaway support post 30. One difference between breakaway support posts 30 and 230 is the replacement of soil plates 52 and 54 by soil plates 254 and 256. As best shown in FIGS. 8 and 9, fastener assembly 160 may be used to attach soil plate 254 with elongated body 32. Fastener assembly 160 includes threaded bolt 163, hollow sleeve or spacer 168 and nut 165. The use of soil plate 254 and fastener assembly 160 eliminates some of the welding steps associated with attaching soil plates 52 and 54 to breakaway support post 30.

Soil plate 254 has a generally rectangular configuration. The length, width and thickness of soil plates 254 may be varied depending upon the intended application for the associated breakaway post 230 and the anticipated soil conditions adjacent to the associated roadway. An appropriately sized hole is preferably formed in the mid-point of soil plate 254 and bolt 162 inserted therethrough. The head 166 of bolt 163 is disposed on the exterior of soil plate 254. Spacer or hollow sleeve 168 is then fitted over the threaded portion of bolt 162 extending from soil plate 254 opposite from head 166. A corresponding hole is preferably formed in web 34 at the desired location for soil plate 254. Bolt 163 is inserted through the hole in web 34 and nut 165 attached thereto.

For some applications, a smaller soil plate 256 may be attached to the exterior of flange 36 adjacent to web 34. The dimensions and location of soil plate 256 may be varied depending upon the anticipated application including soil conditions, associated with highway guardrail system 220.

Figures 10, 11, 12, 13:
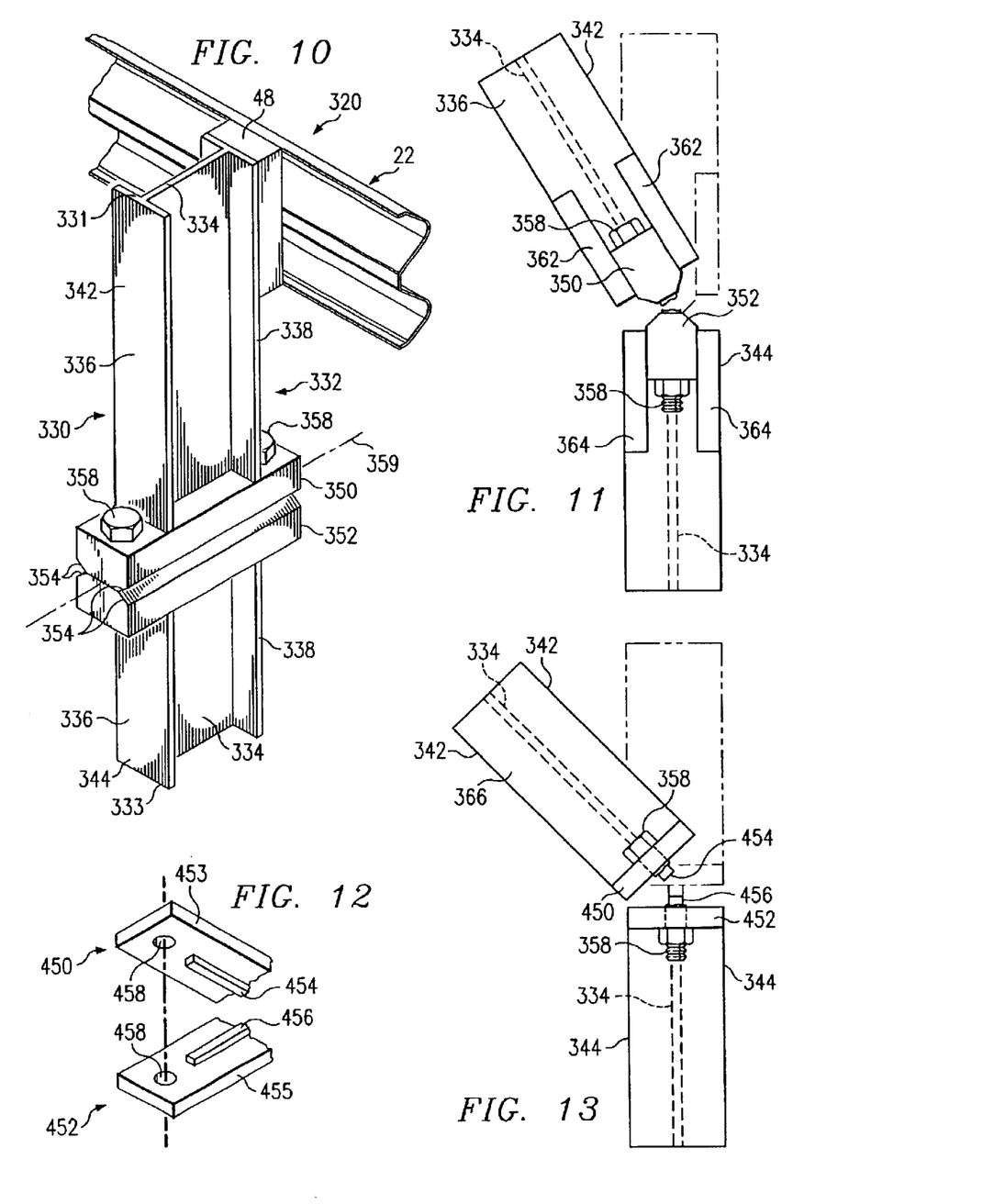
FIG. 10 is a schematic drawing showing an isometric view with portions broken away of a highway guardrail system having a breakaway support post with a guardrail mounted thereon in accordance with another embodiment of the present invention.
FIG. 11 is a schematic drawing in elevation with portions broken away showing a side view of a breakaway support post analogous to the breakaway support post of FIG. 10 rotating from its first position to a second position and separating in response to a force applied to the breakaway support post in one direction corresponding with an impact by a vehicle with one end of the associated guardrail.
FIG. 12 is a schematic drawing showing an exploded, isometric view with portions broken away of an alternative embodiment of breaker bars suitable for use with the guardrail system illustrated in FIGS. 10 and 11.
FIG. 13 is a schematic drawing in elevation with portions broken away showing a side view of the breakaway support post of FIG. 10 utilizing the breaker bars of FIG. 12 and rotating from its first position to a second position and separating in response to a force applied to the breakaway support post in one direction corresponding with an impact by a vehicle with one end of the associated guardrail.

FIGS. 10 and 11 illustrate portions of highway guardrail system 320, which includes breakaway support post 330 and guardrail 22. FIG. 11 illustrates an embodiment of support post 330 having narrower breaker bars 350 and 352 than those illustrated in FIG. 10. Support post 330 includes an elongated body 332 having an upper portion 342 and a lower portion 344. Upper portion 342 and lower portion 344 each have the general configuration of a steel I-beam similar to elongated body 32 of breakaway support post 30.

Upper portion 342 and lower portion 344 are defined in part by respective webs 334 and flanges 336 and 338. Upper portion 342 and lower portion 344 may be formed from a conventional steel I-beam in the same manner as previously described. Lower portion 344 may be positioned substantially within the ground. Alternatively, lower portion 344 could be inserted into a concrete foundation and/or a metal sleeve which have been previously installed at the desired roadside location.

Upper portion 342 and lower portion 344 are provided with breaker bars 350 and 352. In the embodiment shown in FIG. 10, flanges 336 and 338 in upper portion 342 are connected to breaker bar 350, by for example, welds. Flanges 336 and 338 in lower portion 344 may be connected to breaker bar 352 in an analogous fashion. Other suitable connection techniques may be used to couple flanges 336 and 338 of upper and lower portions 342 and 344 to breaker bars 350 and 352, respectively. For example, as illustrated in FIG. 11, tie straps 362 and 364 may be used, particularly in an embodiment where breaker bars 350 and 352 are narrower than flanges 336 and 338, as is the case in FIG. 11. For some applications, breaker bar 352 may be directly attached to a concrete foundation to eliminate the use of lower portion 344.

Breaker bars 350 and 352 are connected to each other by fasteners 358, which is illustrated by a simple nut and bolt; however, other suitable fasteners may be used with this aspect of the invention. Breaker bars 350 and 352 are preferably formed with chamfered or tapered surfaces 354. Chamfered surfaces 354 cooperate with each other to define in part a notch or gap between adjacent portions of breaker bars 350 and 352. Chamfered surfaces 354 extend generally parallel with each other in a direction generally normal to guardrail 22. An imaginary line 359 can also be drawn through fasteners 358 in the same general direction parallel with chamfered surfaces 354 and normal to guardrail 22. Imaginary line 359 corresponds with a strong direction for breakaway support posts 330 in which breakaway support post 330 exhibits high mechanical strength. There is a notch or gap on each side of the imaginary line 359.

Chamfered surfaces 354 cooperate with each other to allow upper portion 342 to pivot relative to lower portion 344 during a head-on impact, as illustrated in FIG. 11. Such pivoting may cause fasteners 358 to break, separating upper portion 342 from lower portion 344 and may therefore substantially minimize damage to a vehicle during a head-on impact with the end of guardrail 22 facing oncoming traffic. The orientation of chamfered surfaces 354 and fasteners 358 relative to each other further define a weak direction for breakaway support post 330 in which support post 330 exhibits low mechanical strength. However, chamfered surfaces 354 do not reduce the ability of guardrail 320 to redirect an impacting vehicle back onto the associated roadway during a rail face impact with guardrail 22.

FIG. 12 is a schematic drawing showing an exploded isometric view with portions broken away of an alternative embodiment of breaker bars suitable for use in guardrail system 320. Breaker bars 450 and 452 perform similar functions as breaker bars 350 and 352. Breaker bar 450 includes a flat plate 453 having a protruding member or projection 454. Breaker bar 452 includes a flat plate 455 having a protruding member or projection 456. Flat plates 453 and 455 are each formed with two or more apertures 458 for receiving a connecting member, such as mechanical fastener 358, for attaching breaker bars 450 and 452 with each other. The use of protruding members or projections 454 and 456 allows upper portion 342 to pivot relative to lower portion 344 during a head-on impact, as illustrated in FIG. 13. Impact from the weak direction for support post 330 will result in bending and preferably failure of connecting members 358. Failure of connecting members 358 separates upper portion 342 from lower portion 344 and may, therefore, substantially minimize damage to a vehicle during a head-on impact with the end of guardrail 22 facing oncoming traffic. However, protruding members or projections 454 and 456 do not reduce the ability of guardrail 22 to redirect an impacting vehicle back onto the associated roadway during a rail face impact.

Figure 14A:
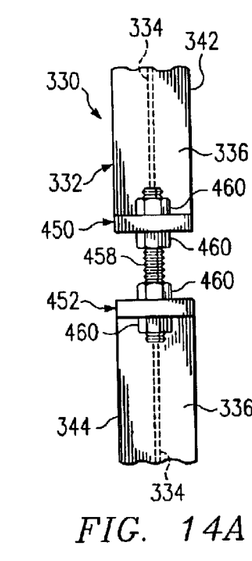
FIG. 14A is a schematic drawing in elevation with portions broken away showing a detail side view of a breakaway support post incorporating a further embodiment of the present invention.
Figure 14B:
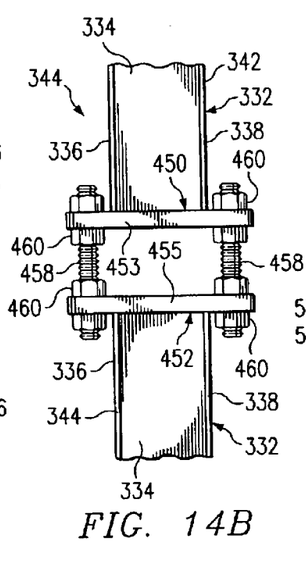
FIG. 14B is a schematic drawing in elevation with portions broken away showing another side view of the breakaway post of FIG. 14A.

FIGS. 14A and 14B are schematic drawings with portions broken away showing an alternative embodiment of a frangible or yieldable connection satisfactory for releasably coupling upper portion 342 with lower portion 344 of support post 330. For this embodiment, breaker bars 450 and 452 are substantially the same as previously described with respect to the embodiment shown in FIG. 13, except for the elimination of protruding members or projections 454 and 456. A pair of elongated connecting members 458 and a plurality of nuts 460 are preferably provided to maintain a desired gap or spacing between breaker bars 450 and 452. For the embodiment shown in FIGS. 14A and 14B, elongated connecting members 458 and nuts 460 have matching threads. However, various types of mechanical fasteners and connecting members may be satisfactorily used to position upper portion 332 of support post 330 relative to lower portion 344.

As a result of incorporated teachings of the present invention, support post 330 has relatively low mechanical strength with respect to impact from a direction generally normal to an imaginary line 359 (see FIG. 10) extending through connecting members 358 or 458 as appropriate. This direction may be referred to as the "weak direction." Connecting members 358 and 458 are preferably formed from materials which will yield and preferably fracture or break to allow upper portion 342 to separate from lower portion 344. Since there is a gap between the breaker bars 350 and 352 or breaker bars 450 and 452 to either side of line 359 in the weak direction, connecting members 358 or 458 as appropriate will carry substantially all of the force or load from an impact in the weak direction.

When support post 330 is impacted from another direction, the resulting force, or at least a component of the resulting force, will tend to place one of the associated connecting members 358 or 458 as appropriate in tension, and will tend to place the other connecting member 358 or 458 as appropriate in compression. Therefore, the mechanical strength of the frangible connection between upper portion 342 and lower portion 344 is substantially greater in the strong direction as compared with an impact from the weak direction. The strongest direction for an impact with support post 330 is from a direction substantially perpendicular to the surface of flanges 338 and 336 and parallel with web 334 (the strong direction). The weakest direction for an impact with support post 330 is in a direction which is substantially perpendicular to web 334 and parallel with flanges 336 and 338.

Spacers with various forms and configurations may be used to separate breaker bars 350 and 352 or 450 and 452 from each other as desired. For the embodiment shown in FIGS. 10 and 11, tapered surfaces or chamfered surfaces 354 form the necessary spacers as integral components of breaker bars 350 and 352. For the embodiment shown in FIGS. 12 and 13, protruding members or projections 454 and 456 function as spacers to form the desired gap. For the embodiment shown in FIGS. 14A and 14B, nuts 460 cooperate with connecting members 458 to function as spacers to form the desired gap. Nuts 460 that are between breaker bars 450 and 452 may also be referred to as "stops."

For some applications, upper portion 342 and lower portion 344 of support post 330 may be coupled with each other by only one connecting member 358 or 458. Alternatively, more than two connecting members 358 or 458 may be used depending upon the anticipated application for the associated support post 330. For some applications, one connecting member 358 or 458 may be provided on the side of support post 330 which is immediately adjacent to guardrail 22. The associated breaker bars 350 and 352 or 450 and 452 will contact each other on the opposite side of the post, whereby the single connecting member 358 or 458 as appropriate will provide sufficient strength for support post 330 to withstand rail face or side impact with the associated guard rail 22.

Support post 530, as shown in FIGS. 15A through 16, is substantially similar to previously described support post 130, except rotatable coupling assembly 140 has been replaced by rotatable coupling assembly or releasable hinge 540. The embodiment shown in FIGS. 15A, 15B, 15C and 16 provides for the separation of upper portion 142 from lower portion 144. Thus, upper portion 142 will not lift an impacting vehicle. Support post 530 may be formed in part by upper portion 142 and lower portion 144 as previously described with respect to support post 130. Coupling assembly or releasable hinge 540 preferably includes a first generally U-shaped bracket 550 attached to one end of upper portion 142, and a second U-shaped bracket 552 attached to an adjacent end of lower portion 144. Brackets 550 and 552 each have a generally open, U-shaped configuration. A portion of bracket 550 is preferably sized to fit over a corresponding portion of bracket 552.

Pivot pin 554 preferably extends through adjacent portions of brackets 552 in a direction which is generally parallel with webs 134. Alternatively, pivot pin 554 may be replaced by generally round projections extending from opposite sides of bracket 552. Bracket 550 preferably includes a pair of slots 572 formed in opposite sides thereof. Slots 572 are preferably sized to releasably engage respective portions of pin 554 which extend from bracket 552. Slots 572 cooperate with pivot pin 554 to allow rotation of upper portion 142 relative to lower portion 144, and to allow disengagement of upper portion 142 from lower portion 144.

The resulting breakaway support post 530 is preferably installed with webs 134 and pivot pin 554 extending generally normal from the associated guardrail 22. As a result of this orientation, webs 134 and releasable hinge 540, including pivot pin 554, allow support post 530 to adequately support guardrail 22 during a rail face impact to redirect an impacting vehicle back onto the associated roadway.

Shear pin 556 is preferably inserted through adjacent portions of brackets 550 and 552 offset from pivot pin 554. Shear pin 556 maintains upper portion 142 and lower portion 144 generally aligned with each other during installation of the associated breakaway support post 530. Shear pin 556 preferably has a relatively small cross-section as compared to pivot pin 554. As a result, when a vehicle impacts with one end of guardrail 22, shear pin 556 will break and allow upper portion 142 to rotate relative to lower portion 144 as shown in FIG. 16. For some applications, push bar 580 is preferably attached to and extends between opposite sides of bracket 552. The location of push bar 580 on bracket 552 is selected to assist disengagement of slot 572 from pivot pin 554 as upper portion 142 rotates relative to lower portion 144. See FIG. 16.

The amount of force required to fracture or break shear pin 556 may be determined by a variety of parameters such as the diameter of shear pin 556, the type of material used to fabricate shear pin 556, the number of locations (either along a single pin or with plural pins) that must be sheared, and the distance between shear pin 556 and pivot pin 554.

Various types of releasing mechanisms other than shear pin 556 may be satisfactorily used to maintain upper portion 142 and lower portion 144 generally aligned with each other during normal installation and use of the associated breakaway support 530. A wide variety of shear bolts, shear screws, frangible disks, and/or breakaway clamps may be used to releasably attach first bracket 550 with second bracket 552.

When a vehicle impacts with one end of guardrail 22, force is applied in a first direction (weak direction) to upper portion 142 and will break shear pin 556. As a result, upper portion 142 will then rotate relative to lower portion 144 as shown in FIG. 16. When portions of bracket 550 contact push bar 580, slots 572 will disengage from pivot pin 554 and release upper portion 142 from lower portion 144.

Although the present invention and its advantages have been described in detail it should be understood that various changes, substitutions, and alterations can be made hereto without departing from the spirit and scope of the invention as defined by the following claims.

What is claimed is:

1. A breakaway support post for mounting a guardrail thereon as part of a highway guardrail system disposed adjacent to a roadway comprising:

an elongated body which resists impact by a motor vehicle from a strong direction and yields to impact by the motor vehicle from a weak direction;

the weak direction and the strong direction disposed substantially perpendicular to each other;

the elongated body having a first end and a second end;

the elongated body having a cross section operable to be oriented with respect to an attached guardrail, the cross section having a low mechanical strength in the weak direction whereby an impact from the weak direction with one end of an attached guardrail, which is substantially parallel to said weak direction, will tend to buckle the breakaway support post;

the cross section further operable to be oriented with respect to the attached guardrail to resist an impact in the strong direction and the elongated body operable to be driven directly into the soil adjacent to the roadway.

2. The breakaway support post of claim 1 wherein the elongated body further comprises:

an I-beam having a web with a pair of flanges attached thereto; and multiple openings formed in the flanges of the I-beam.

3. The breakaway support post of claim 1 further comprising means for attaching a block between the first end of the elongated body and a guardrail to form a lateral offset between the guardrail and the breakaway support post.

4. The breakaway support post of claim 1 further comprising at least one soil plate attached to the elongated body.

5. A breakaway support post for mounting a guardrail thereon as part of a highway guardrail system comprising:

an elongated body operable to resist an impact by a motor vehicle from a strong direction and operable to yield in response to an impact by a motor vehicle from a weak direction;

the weak direction and the strong direction disposed substantially normal to each other;

the weak direction oriented generally parallel with an attached guardrail;

the strong direction oriented generally perpendicular with an attached guardrail;

means for attaching a guardrail adjacent to the first end of the elongated body;

a plurality of openings formed in the elongated body intermediate the first end and the second end, the plurailty of openings located in a plane that is generally parallel to the attached guardrail; and the elongated body having a cross section operable to be oriented with respect to the attached guardrail whereby an impact from the weak direction with one end of the attached guardrail will tend to buckle the breakaway support post proximate the openings and the breakaway support post will resist a rail face impact with the guardrail from the strong direction.

6. A roadway guardrail system, comprising:

a guardrail;

at least one support post defined in part by an I-beam having a web and flange, wherein the flanges are formed at each end of the web and extend perpendicular from the end of the web such that the I-beam forms an I shape;

the support post having a first end and a second end;

the first end coupled to the guardrail by way of one of the flanges and the second end operable to be located in the earth;

each flange having at least one opening formed therein and disposed near the surface of the earth when the support post is located in the earth; and the openings defining in part a frangible connection between the first and second end of the support post whereby an impact with one end of an attached guardrail will tend to buckle the support post and the support post will resist a rail face impact with an attached guardrail.

7. The system of claim 6 wherein the openings comprise vertical slots.

8. The system of claim 6 further comprising the support post operable to be directly driven into soil adjacent to a roadway.

9. A support post for mounting a guardrail thereon as part of a highway guardrail system comprising:

an elongated body having a first portion defining a first end of the elongated body and a second portion defining a second end of the elongated body;

a frangible connection coupling the first portion with the second portion;

the frangible connection operable to be oriented generally parallel to an attached guardrail and in such orientation having a low mechanical strength such that an impact with one end of the attached guardrail will tend to buckle the support post; and the frangible connection operable to be oriented relative to the guardrail such that the support post will resist a rail face impact with the attached guardrail.

10. The support post of claim 9 wherein the frangible connection further comprises a plurality of openings formed in the elongated body.

11. A roadway guardrail system, comprising:

a guardrail;

at least one support post, the support post comprising an I-beam having a web and flanges, wherein the flanges are formed at each end of the web and extend perpendicular from the end of the web such that the I-beam forms an I shape;

the support post having a first end and a second end, the first end being coupled to the guardrail and the second end being structured and arranged to be located in the earth; and the flanges having vertical slots therein located near the surface of the earth when the support post is located in the earth.

12. A support post for mounting a guardrail thereon as part of a highway guardrail system comprising:

an elongated body having a first portion and a second portion;

a frangible connection for coupling the first portion with the second portion; and the frangible connection operable to be oriented generally parallel to the guardrail and in such orientation having a low mechanical strength whereby an impact with one end of the guardrail will tend to buckle the support post and the support post will resist a rail face impact with the guardrail.

13. The support post of claim 12 further comprising:

the elongated body having a first end and a second end; and a plurality of openings formed in the elongated body intermediate the first end and the second end to define in part the frangible connection.

14. A breakaway support post for mounting a guardrail thereon as part of a highway guardrail system comprising;

an elongated body defined in part by an I-beam having a web and flanges, wherein the flanges are formed at each end of the web and extend perpendicular from the end of the web such that the I-beam forms an I shape;

the support posts having a first end and a second end;

the first end operable to be coupled to a guardrail and the second end operable to be located in the earth adjacent to a roadway;

each flange having at least one opening formed therein and disposed near the surface of the earth when the support post is located in the earth; and the openings in the flanges cooperating with each other to allow an impact by a vehicle with one end of an attached guardrail to buckle the support post and to allow the support post to resist a rail face impact by a vehicle with an attached guardrail.

15. The breakaway support post of claim 14 wherein the openings comprise vertical slots.

16. The breakaway support post of claim 2 wherein the openings are located so as to be above and near the soil when the post is located in the soil.

17. The breakaway support post of claim 2 wherein the multiple openings further comprise at least four openings, with each flange having at least two openings, with the respective two openings being on opposite sides of the web.

18. The breakaway support post of claim 2 further comprising means for attaching a block between the first end of the elongated body and a guardrail to form a lateral offset between the guardrail and the breakaway support post.

* * * * *